April 24, 1962 M. F. EASTERLING 3,031,612
APPARATUS FOR INVESTIGATING EARTH FORMATIONS
Filed Sept. 8, 1958
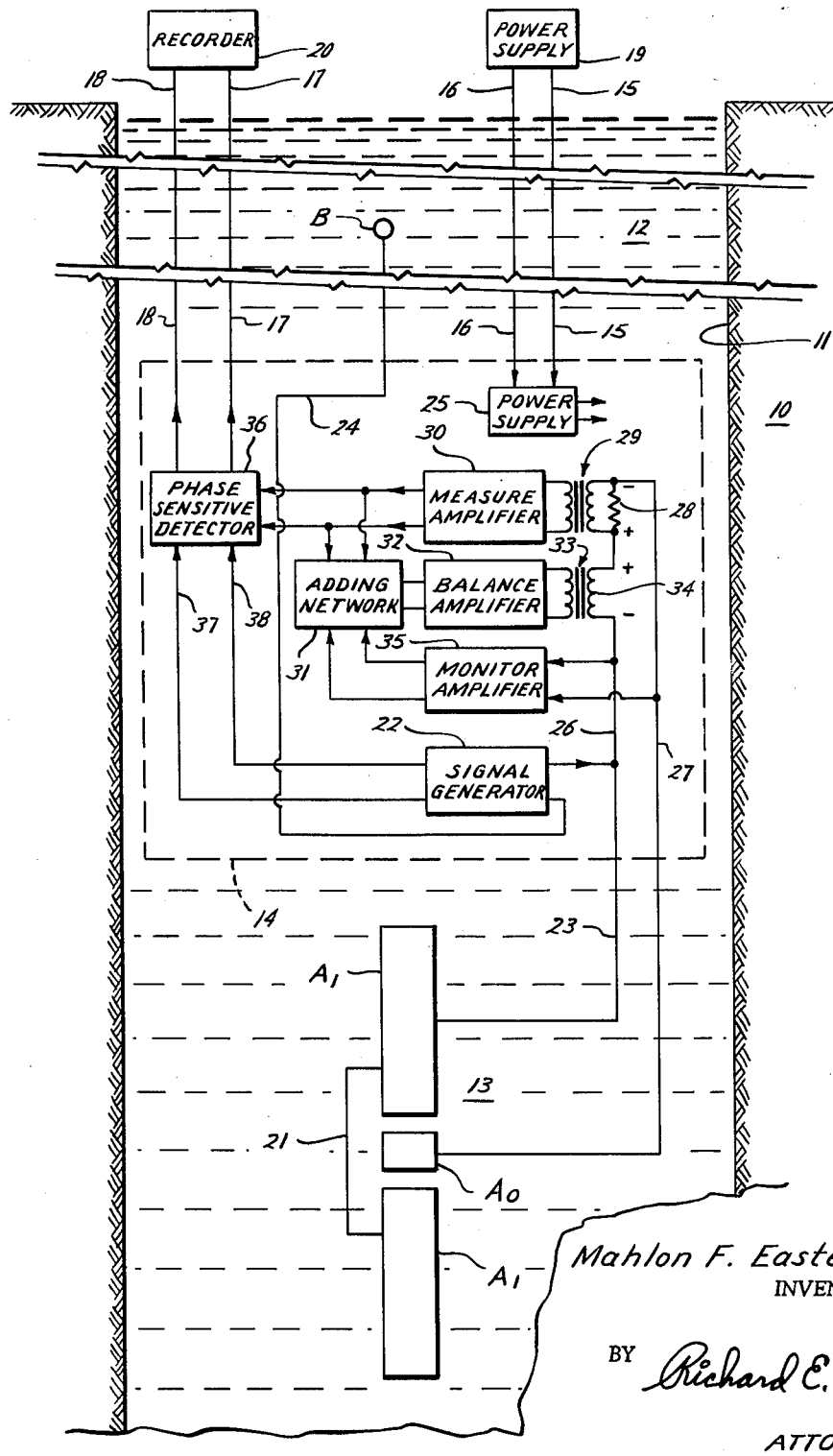
Mahlon F. Easterling
INVENTOR.
BY Richard E. Bee
ATTORNEY United States Patent Office 3,031,612
Patented Apr. 24, 1962

3,031,612
APPARATUS FOR INVESTIGATING EARTH FORMATIONS
Mahlon F. Easterling, Houston, Tex., assignor to Schlumberger Well Surveying Corporation, Houston, Tex., a corporation of Texas
Filed Sept. 8, 1958, Ser. No. 759,743
14 Claims. (Cl. 324—1)

This invention relates to electrical apparatus for investigating subsurface earth formations traversed by a borehole and, particularly, to such apparatus of the type utilizing current-emitting electrodes which are lowered into the borehole for passing electrical current into the subsurface formations for obtaining indications of the resistivity or conductivity characteristics thereof.

It has become accepted practice to obtain, by so-called "focussed" measurements, electrical logs of the earth formations traversed by a borehole whereby the resistivity or conductivity indications are more nearly representative of the actual resistivity or conductivity sought to be measured. Such focussed measurements are obtained by automatically controlling the potential and current distribution in the vicinity of an electrical logging array passed through such borehole so as to obtain desired current flow patterns. In these focussed systems, a survey current is emitted by a principal electrode in the borehole and is confined to a path substantially perpendicular to the borehole axis by auxiliary currents emitted from nearby electrodes on opposite sides of the principal electrode. Either one or both of these survey and auxiliary currents are supplied by feedback amplifier means responsive to resulting potentials established in the vicinity of the current-emitting electrodes for maintaining the desired confining or focussing action as formation conditions vary.

While such prior systems have been quite successful, producing good quality electrical logs of the subsurface formations, there is, nevertheless, still room for further improvement, particularly in regards to the complexity of the apparatus and the amount of gain or amplification required in the feedback amplifier means associated with the apparatus.

It is an object of the invention, therefore, to provide new and improved borehole investigating apparatus of the above character which is capable of providing direct indications of the electrical conductivity of the subsurface earth formations with a minimum of circuit complexity.

It is another object of the invention to provide new and improved borehole investigating apparatus of the above character for providing more accurate measurements of current flow in the subsurface earth formations.

It is a further object of the invention to provide new and improved borehole investigating apparatus of the above character in which the demands made on the feedback amplifying means under extreme borehole conditions are not as severe as they sometimes were in the systems heretofore utilized.

In accordance with the invention, apparatus for investigating earth formations traversed by a borehole comprises first and second electrodes adapted to be moved through the borehole. The apparatus also includes means coupled to the first electrode and to a current-return point for passing current from the first electrode into adjacent earth formations. The apparatus further includes impedance means coupled between the first and second electrodes for providing a current flow path therebetween for passing current from the second electrode into adjacent earth formations and for developing a signal representative of such current flow. The apparatus additionally includes feedback circuit means responsive to such current-representative signal for adding in series with the impedance means a voltage for offsetting the voltage drop across the impedance means while maintaining the second electrode current flow. The apparatus also includes means coupled to the impedance means for providing an indication of the current flow.

For a better understanding of the present invention, together with other and further objects thereof, reference is had to the following description taken in connection with the accompanying drawing, the scope of the invention being pointed out in the appended claims.

The single FIGURE of the drawing illustrates schematically a representative embodiment of borehole investigating apparatus constructed in accordance with the present invention.

Referring to the drawing, there is shown a representative embodiment of apparatus constructed in accordance with the present invention for investigating subsurface earth formations 10 traversed by a borehole 11. Borehole 11 is filled with an electrically conductive drilling fluid 12, commonly referred to as "drilling mud". The investigating apparatus includes an electrode array 13 and a fluid-tight housing or electronic cartridge 14 which are suitably secured to one another for movement together through the borehole 11. The exterior of the cartridge 14 is either formed of or covered with a suitable insulation material for electrically insulating such exterior from the drilling mud 12. Movement of electrode array 13 and cartridge 14 through the borehole 11 is provided by suspending the cartridge 14 in the borehole by means of an armored multiconductor cable which, in turn, is connected to a suitable winch mechanism located at the surface of the earth. Conductors 15–18, inclusive, represent individual ones of the various insulated conductors contained in such armored cable. The first 100 feet or so of the armored cable adjacent the cartridge 14 is electrically insulated from the drilling mud 12 by means of a covering or boot of insulation material disposed around the exterior thereof. A current-return electrode B is suitably mounted on the insulation-covered lower portion of the armored cable.

Located at the surface of the earth is a power supply unit 19 for supplying operating energy to the downhole electrical circuits and a recorder 20 for recording signals sent up from such downhole circuits. The operating energy may be in the form of a 60-cycle alternating current. The recorder 20 has associated therewith a suitable driving mechanism which is coupled to the armored supporting cable for advancing the recording medium in step with movement of the downhole apparatus through the borehole 11.

In accordance with the present invention, the downhole portion of the apparatus includes first and second electrodes adapted to be moved through the borehole 11. For the illustrated embodiment, these electrodes comprise the electrode array 13 which includes a pair of electrically-interconnected elongated electrodes $A_1$ and a central electrode $A_0$ positioned intermediate the elongated $A_1$ electrodes and adapted for movement therewith. These electrodes are formed of conductive material and are mounted on a suitable insulated support member which, in turn, is secured to the cartridge 14. The upper and lower $A_1$ electrodes are electrically interconnected by a conductor 21 which serves to maintain these two electrodes at substantially the same potential level. An electrode array of this general type is shown and described in greater detail in U.S. Patent No. 2,712,628, granted to H. G. Doll on July 5, 1955.

The investigating apparatus further includes means coupled to the first electrode, in this case, one of the $A_1$ electrodes, and to a current-return point, in this case, the current-return electrode B, for passing current from the $A_1$ electrodes into adjacent earth formations. The current-return electrode B is located a sufficient distance above the electrode array 13 so as effectively to be electrically remote therefrom. In the present embodiment wherein formation conductivity is measured, this means for passing current from the $A_1$ electrodes is represented by a signal generator 22 which is coupled to the upper $A_1$ electrode by way of a conductor 23 and to the remote current-return electrode B by way of a conductor 24 so as to maintain the potential level of the $A_1$ electrodes substantially constant with respect to the B electrode. The current supplied by signal generator 22 may be, for example, an alternating current having a frequency of 400 cycles. Operating energy for the signal generator 22, as well as for the other electronic circuits to be mentioned hereinafter, is supplied by way of a downhole power supply unit 25 which is coupled to the surface power supply unit 19 by way of cable conductors 15 and 16. For sake of simplicity, the power supply connections between the downhole power supply 25 and the various downhole electronic circuits have been omitted.

The investigating apparatus also includes impedance means coupled between the first and second electrodes, in this case, between the $A_1$ and $A_0$ electrodes, for providing a current flow path therebetween for passing current from the $A_0$ electrode into adjacent earth formations and for developing a signal representative of such current flow. In the present embodiment the current flow path established by this impedance means includes conductors 23, 26 and 27 and a measuring resistor 28 connected in series with these conductors for developing a voltage signal representative of the current flowing from the signal generator 22 to the central $A_0$ electrode.

The investigating apparatus further includes feedback circuit means responsive to the signal representative of current flow to the $A_0$ electrode for adding in series with the impedance means represented by conductors 26 and 27 and measuring resistor 28 a voltage for offsetting the voltage drop across this impedance means while maintaining the desired current flow to the $A_0$ electrode. In the present embodiment, this feedback circuit means includes first feedback circuit means responsive to the current-representative signal for adding in series in the $A_0$ current flow path a voltage of polarity opposite to the voltage drop across the impedance in this path for minimizing the net voltage difference between the $A_0$ and $A_1$ electrodes. In the present embodiment, there is also included a second feedback circuit means responsive to any remaining net voltage difference between the $A_0$ and $A_1$ electrodes for also adding in series in the $A_0$ current flow path a voltage component for further minimizing such net voltage.

In the illustrated embodiment, the first feedback circuit means takes the form of amplifier circuit means having an input circuit coupled to the measuring resistor 28 and an output circuit coupled in series therewith. Such amplifier circuit means includes in cascade an input transformer 29, a measure amplifier 30, an adding network 31, a balance amplifier 32 and an output transformer 33 having its secondary winding 34 coupled in series with the measuring resistor 28 and, hence, in series in the $A_0$ current flow path. The second feedback circuit means, on the other hand, includes amplifier circuit means having an input circuit coupled between the $A_0$ and $A_1$ electrodes and an output circuit coupled in series with the measuring resistor 28. Such amplifier circuit means includes in cascade a monitor amplifier 35 and the previously-mentioned adding network 31, balance amplifier 32 and output transformer 33. Thus, the adding network 31, the balance amplifier 32 and the output transformer 33 are common to both of the first and second feedback circuits.

The terms "measure," "balance" and "monitor" as applied to amplifiers 30, 32 and 35 refer to their primary functions in the present system and not to the internal construction of such amplifiers as such internal construction is of a conventional form. Measure amplifier 30 and monitor amplifier 35, however, preferably have relatively high input impedances in order to minimize the loading on signal generator 22. The adding network 31 may take the form of any of various known types of circuits for combining a pair of signals while isolating the sources of such signals from one another. To this end, such network 31 may consist of a pair of amplifier circuits having a common output circuit. Instead, it might take the form of a resistor adding network.

The investigating apparatus further includes means coupled to the impedance means, in this case, the measuring resistor 28, for providing an indication of the $A_0$ current flow. This means includes a phase-sensitive detector 36 which is coupled to the measuring resistor 28 by way of the measure amplifier 30 and input transformer 29. Also supplied to the phase-sensitive detector is an actuating or phase-sensitizing signal from the signal generator 22, this latter signal being supplied by way of conductors 37 and 38. The phase-sensitive detector 36 is, in turn, coupled to the recorder 20 at the surface of the earth by way of the cable conductors 17 and 18.

In operation, as the electrode array 13 and the cartridge 14 are moved together through the borehole, the signal generator 22 operates to maintain a constant voltage difference between the $A_1$ electrodes and the remote current-return electrode B. As a result, current flows from the $A_1$ electrodes into the earth formations and then back to the current-return electrode B. Because the central $A_0$ electrode is connected to one of the $A_1$ electrodes by way of conductors 23, 26 and 27, secondary winding 34 and measuring resistor 28, very nearly the same voltage is applied between this $A_0$ electrode and the remote electrode B. Consequently, there is a second flow of current from this $A_0$ electrode into the formations. This second or survey current flow is constrained to a path substantially perpendicular to the longitudinal axis of the borehole by the currents flowing from the upper and lower $A_1$ electrodes or, more accurately, by the voltage or potential distribution in the vicinity of the electrodes. In particular, if the central $A_0$ electrode is maintained at the same voltage level as the elongated $A_1$ electrodes, then there will be no voltage gradient in a vertical direction and the current flow from $A_0$ will be substantially horizontal for a considerable distance into the formations. Consequently, the magnitude of the $A_0$ current flow is determined primarily by the conductivity of a thin slice of the formations opposite the $A_0$ electrode. This represents the desired focussing action and enables the resulting measurements to be more detailed in nature and also to more nearly represent the true formation conductivity.

The magnitude of this $A_0$ current flow produces a corresponding voltage drop across the measuring resistor 28, which voltage drop or voltage signal is supplied by way of the measure amplifier 30 and the phase-sensitive detector 36 to the recorder 20 located at the surface of the earth. In this manner, there is recorded by the recorder 20 a continuous signal which is proportional to the formation conductivity opposite the $A_0$ electrode. Movement of the recording medium of recorder 20 in step with movement of the electrode array through the borehole enables the desired conductivity profile of the borehole to be obtained.

A problem arises, however, because the finite value of the measuring resistor 28 introduces an error into the $A_0$ current measurement. In other words, for a given value of signal generator 22 output voltage, the current that actually flows from the $A_0$ electrode differs from that which would flow in the absence of the measuring resistor 28 due to the voltage drop across such resistor 28. Accordingly, the value of this resistor should be kept as small as possible. A limit is reached, however, in that if the resistance value of resistor 28 is made too small then the resulting signal voltage developed thereacross will be obscured by the electrical noise which is inevitably present.

In accordance with the present invention, means have been found for enabling this resistor 28 to assume a sufficient value for developing a useful magnitude of measure signal without at the same time appreciably affecting the $A_0$ current flow. To this end, the signal appearing at the output of measure amplifier 30 is fed back by way of the adding network 31, the balance amplifier 32 and the output transformer 33 and added in series with the resistor 28 but with a polarity opposite to that of the voltage drop across resistor 28 caused by $A_0$ current flow therethrough. By suitable selection of the signal gain factors in amplifiers 30 and 32, the magnitude of the opposite polarity voltage appearing across the secondary winding 34 of output transformer 33 can be made exactly equal to the voltage drop across the measuring resistor 28, thus effectively reducing to zero the voltage difference between the signal generator 22 output and the $A_0$ electrode. At the same time, the $A_0$ current continues to flow. Accordingly, in effect, the impedance between the signal generator 22 output and the $A_0$ electrode has been reduced to zero.

The resistance of measuring resistor 28 does not constitute the entire impedance in the current flow path between the signal generator 22 output and the $A_0$ electrode. The secondary winding 34 of transformer 33 also introduces some resistance into the current flow path as does the stray impedance of conductors 26 and 27. By proper adjustment of the gains of amplifiers 30 and 32, however, the opposite polarity voltage fed back to the secondary winding 34 may be made of such a value as to offset the total voltage drop between the signal generator 22 output and the $A_0$ electrode and not just the voltage drop across resistor 28 alone. When this condition obtains, then the total voltage drop is effectively cancelled and the $A_0$ current flow assumes the desired value. Consequently, the conductivity signals recorded by the recorder 20 will be more accurately representative of the formation conductivity opposite the $A_0$ electrode.

Another way of looking at the situation is to realize that when any voltage difference exists between the $A_1$ and $A_0$ electrodes, then the path to which the current flow from the $A_0$ electrode is confined will be altered. In particular, if the voltage difference undergoes any variation, then the current flow path will likewise vary and, accordingly, it will be difficult to ascertain just which portion of the formation is being measured. When the voltage drops across the various impedances between the signal generator 22 output and the $A_0$ electrode are effectively cancelled, however, then zero voltage difference will be accurately maintained between the $A_0$ and $A_1$ electrodes and the resulting $A_0$ current flow path into the formations will be more accurately fixed.

It should be noted that the feedback circuit formed by the measure amplifier 30, the adding network 31, balance amplifier 32 and the output transformer 33 is actually a positive feedback circuit. This is because the voltage polarity across the secondary winding 34 is such as to increase the current flow to the $A_0$ electrode. This, in turn, causes an increase in the voltage drop across the resistor 28, which increase in voltage is supplied to the input of the feedback circuit by the transformer 29. To prevent circuit oscillations, therefore, the loop gain of this feedback circuit is chosen to be slightly less than unity. In this regard, it should be noted that the formation impedance between the $A_0$ and $A_1$ electrodes enters into the determination of this loop gain. In particular, if the value of the resistor 28 is made small, relative to the formation impedance between the $A_0$ and $A_1$ electrodes, then a goodly portion of the total voltage drop caused by the $A_0$ current will appear across the formation impedance and not across the resistor 28. Consequently, the feedback fraction will be less than unity. A value of one ohm for the resistor 28 has been found to be satisfactory for giving both a satisfactory signal level and the necessary protection against circuit oscillations.

Having selected a suitable value for the measuring resistor 28, the gains of amplifiers 30 and 32 can then be selected to provide the requisite magnitude of opposite polarity voltage across the secondary winding 34. For exact cancellation, the net signal gain between the primary of transformer 29 and the secondary winding 34 of transformer 33 by way of amplifiers 30 and 32 should equal the ratio of the total resistance between the signal generator 22 output and the $A_0$ electrode to the resistance of the measuring resistor 28.

Under operating conditions actually encountered in a borehole, it is frequently difficult to maintain the gains of measure amplifier 30 and balance amplifier 32 and the impedance values of measuring resistor 28, secondary winding 34 and the lead conductors 26 and 27 exactly constant as the borehole temperature varies. As a result, the operation of the positive feedback loop may be somewhat less than perfect. When this occurs, a small voltage difference will appear between the $A_0$ and $A_1$ electrodes and this voltage may be either in phase with or in opposition to the $A_0$ current, depending on the relative changes in these various factors.

Should such a voltage difference appear, it may be substantially compensated for by utilizing a second feedback circuit as represented by the monitor amplifier 35, adding network 31, balance amplifier 32 and the transformer 33. The input of monitor amplifier 35 is connected between the conductors 26 and 27 and, hence, between the $A_0$ and $A_1$ electrodes. This is to be distinguished from the first feedback loop wherein the input is effectively coupled in series in the $A_0$ current flow path. Consequently, this second feedback loop is responsive to any net voltage difference between the $A_0$ and $A_1$ electrodes for amplifying such difference and adding in series by way of the secondary winding 34 a voltage component of proper polarity for cancelling such voltage difference. In other words, this second feedback loop is a negative feedback loop in that its output serves to reduce or minimize the input to the loop. A moderate amount of gain in this negative feedback loop, such as a loop gain of 100, serves to reduce any residual voltage difference by a factor of 100.

In terms of impedances, assuming the measure resistor has a resistance of one ohm and the remainder of the resistance in the current flow path is also one ohm, then if the combined gain of amplifiers 30 and 32 is in error by a factor of 5%, the resistance between the $A_0$ and $A_1$ electrodes would nevertheless be reduced to 0.1 ohm without the monitor amplifier 35. If the monitor amplifier 35 is used and has a gain of 100, the circuit resistance between the $A_0$ and the $A_1$ electrodes would then be reduced to 0.001 ohm. This value of effective resistance has been found to be sufficiently small to reduce any errors in measuring current flow to a negligible degree.

It will be noted that the adding network 31 merely serves to combine the two feedback signals from the measure amplifier 30 and the monitor amplifier 35 in such a manner that none of the signal from amplifier 35 can feed through to the phase-sensitive detector 36. Any attenuation suffered by either signal in passing through this network must be taken into account in selecting the corresponding loop gains. No special weighting of the feedback signals relative to one another is intended.

While there has been described what is at present considered to be a preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In apparatus for investigating earth formations traversed by a borehole, the combination comprising: first and second electrodes adapted to be moved through the borehole; means coupled to said first electrode and to a current-return point for passing current from said first electrode into adjacent earth formations; impedance means coupled between said first and second electrodes for providing a current flow path therebetween for passing current from said second electrode into adjacent earth formations and for developing a signal representative of such current flow; feedback circuit means responsive to said signal for adding in series with said impedance means a voltage for offsetting the voltage drop across said impedance means while maintaining said second electrode current flow; and means coupled to said impedance means for providing an indication of said current flow.

2. In apparatus for investigating earth formations traversed by a borehole, the combination comprising: first and second electrodes adapted to be moved through the borehole; means coupled to said first electrode and to a current-return point for passing current from said first electrode into adjacent earth formations; impedance means coupled between said first and second electrodes for providing a current flow path therebetween for passing current from said second electrode into adjacent earth formations and for developing a signal representative of such current flow; feedback circuit means responsive to a voltage difference intermediate said electrodes for adding in series with said impedance means a voltage for minimizing such voltage difference while maintaining said second electrode current flow; and means responsive to said signal for providing an indication of said current flow.

3. In apparatus for investigating earth formations traversed by a borehole, the combination comprising: first and second electrodes adapted to be moved through the borehole; means coupled to said first electrode and to a current-return point for passing current from said first electrode into adjacent earth formations; impedance means coupled between said first and second electrodes for providing a current flow path therebetween for passing current from said second electrode into adjacent earth formations and for developing a signal representative of such current flow; feedback circuit means responsive to said signal for adding in series in said current flow path a voltage of polarity opposite to the voltage drop across said impedance means for offsetting such voltage drop while maintaining said second electrode current flow; and means coupled to said impedance means for providing an indication of said current flow.

4. In apparatus for investigating earth formations traversed by a borehole, the combination comprising: first and second electrodes adapted to be moved through the borehole; means coupled to said first electrode and to a current-return point for passing current from said first electrode into adjacent earth formations; impedance means coupled between said first and second electrodes for providing a current flow path therebetween for passing current from said second electrode into adjacent earth formations and for developing a signal representative of such current flow; feedback circuit means responsive to said signal for adding in series in said current flow path a voltage of polarity opposite to the voltage drop across said impedance means for minimizing the net voltage difference between said electrodes while maintaining said second electrode current flow; and means coupled to said impedance means for providing an indication of said current flow.

5. In apparatus for investigating earth formations traversed by a borehole, the combination comprising: a pair of electrically interconnected elongated electrodes adapted to be moved through the borehole; means coupled to said elongated electrodes and to a current-return point for passing current from said elongated electrodes into adjacent earth formations; a central electrode positioned intermediate said elongated electrodes and adapted for movement therewith; impedance means coupled between said elongated and central electrodes for providing a current flow path therebetween for passing current from said central electrode into adjacent earth formations and for developing a signal representative of such current flow; feedback circuit means responsive to said signal for adding in series in said current flow path a voltage of polarity opposite to the voltage drop across said impedance means for minimizing the net voltage difference between said elongated and central electrodes while maintaining said central electrode current flow; and means coupled to said impedance means for providing an indication of said current flow.

6. In apparatus for investigating earth formations traversed by a borehole, the combination comprising: first and second electrodes adapted to be moved through the borehole; means coupled to said first electrode and to a current-return point for passing current from said first electrode into adjacent earth formations; electrical circuit elements connected in series between said first and second electrodes for providing a current flow path therebetween for passing current from said second electrode into adjacent earth formations, one of these circuit elements comprising a measuring resistor for developing a signal representative of current flow in this path; feedback circuit means responsive to said signal for developing across another of said circuit elements, a voltage of polarity opposite to the voltage drop across said measuring resistor for minimizing the net voltage difference between said electrodes while maintaining said second electrode current flow; and means responsive to said signal for providing an indication of said current flow.

7. In apparatus for investigating earth formations traversed by a borehole, the combination comprising: first and second electrodes adapted to be moved through the borehole; means coupled to said first electrode and to a current-return point for passing current from said first electrode into adjacent earth formations; impedance means coupled between said first and second electrodes for providing a current flow path therebetween for passing current from said second electrode into adjacent earth formations and for developing a signal representative of such current flow; amplifier circuit means having an input circuit coupled to said impedance means for amplifying said signal and having an output circuit element coupled in series in said current flow path for adding in series therein a voltage of polarity opposite to the voltage drop across said impedance means for minimizing the net voltage difference between said electrodes while maintaining said second electrode current flow; and means coupled to said impedance means for providing an indication of said current flow.

8. In apparatus for investigating earth formations traversed by a borehole, the combination comprising: first and second electrodes adapted to be moved through the borehole; means coupled to said first electrode and to a current-return point for passing current from said first electrode into adjacent earth formations; passive impedance means directly coupled between said first and second electrodes for providing a direct current flow path therebetween for passing current from said second electrode into adjacent earth formations and for developing a signal representative of such current flow; amplifier circuit means having an input circuit coupled between said electrodes for amplifying any voltage difference therebetween and having an output circuit element coupled in series in said current flow path for adding in series therein a voltage for minimizing the net voltage difference between said electrodes while maintaining said second electrode current flow; and means responsive to said signal for providing an indication of said current flow.

9. In apparatus for investigating earth formations traversed by a borehole, the combination comprising: first and second electrodes adapted to be moved through the borehole; means coupled to said first electrode and to a current-return point for passing current from said first electrode into adjacent earth formations; impedance means coupled between said first and second electrodes for providing a current flow path therebetween for passing current from said second electrode into adjacent earth formations and for developing a signal representative of such current flow; first feedback circuit means responsive to said signal for adding in series in said current flow path a voltage of polarity opposite to the voltage drop across said impedance means for minimizing the net voltage difference between said electrodes while maintaining said second electrode current flow; second feedback circuit means responsive to any remaining net voltage difference between said electrodes for adding in series in said path a voltage component for further minimizing such net voltage difference; and means coupled to said impedance means for providing an indication of said current flow.

10. In apparatus for investigating earth formations traversed by a borehole, the combination comprising: first and second electrodes adapted to be moved through the borehole; means coupled to said first electrode and to a current-return point for passing current from said first electrode into adjacent earth formations; impedance means coupled between said first and second electrodes for providing a current flow path therebetween for passing current from said second electrode into adjacent earth formations and for developing a signal representative of such current flow; positive feedback circuit means responsive to said signal for adding in series in said current flow path a voltage of polarity opposite to the voltage drop across said impedance means for minimizing the net voltage difference between said electrodes while maintaining said second electrode current flow, the loop gain associated with this feedback means being less than unity; negative feedback circuit means responsive to any remaining net voltage difference between said electrodes for adding in series in said path a voltage component for further minimizing such net voltage difference, the loop gain associated with this feedback means being substantially greater than unity; and means coupled to said impedance means for providing an indication of said current flow.

11. In apparatus for investigating earth formations traversed by a borehole, the combination comprising: first and second electrodes adapted to be moved through the borehole; means coupled to said first electrode and to a current-return point for passing current from said first electrode into adjacent earth formations; impedance means coupled between said first and second electrodes for providing a current flow path therebetween for passing current from said second electrode into adjacent earth formations and for developing a signal representative of such current flow; first amplifier circuit means responsive to said current-representative signal for amplifying same; second amplifier circuit means responsive to any voltage difference between said electrodes for developing an amplified signal representative of such voltage difference; third amplifier circuit means responsive to both of said amplified signals for adding in series in said current flow path a voltage of polarity opposite to the voltage drop across said impedance means for maintaining substantially zero voltage difference between said electrodes while maintaining said second electrode current flow; and means coupled to said impedance means for providing an indication of said current flow.

12. In apparatus for investigating earth formations traversed by a borehole, the combination comprising: a pair of electrically interconnected elongated electrodes adapted to be moved through the borehole; a central electrode positioned intermediate the elongated electrodes and adapted for movement therewith; circuit means coupled to the elongated electrodes and to a current-return point for energizing the elongated electrodes with a substantially constant potential relative to the current-return point; passive, low-impedance electrical circuit elements directly connected in series between the elongated and central electrodes for energizing the central electrode with approximately the same potential as is applied to the elongated electrodes, one of these circuit elements comprising means for developing a signal representative of the amount of current flowing from the central electrode into adjacent earth formations; feedback circuit means responsive to the current-representative signal for developing across another of the circuit elements a voltage of polarity opposite to the voltage drop across the first-mentioned circuit element for minimizing the voltage difference between the elongated and central electrodes while maintaining the central electrode current flow; and means responsive to the current-representative signal for providing an indication of the central electrode current flow.

13. In apparatus for investigating earth formations traversed by a borehole, the combination comprising: a pair of electrically interconnected elongated electrodes adapted to be moved through the borehole; a central electrode positioned intermediate the elongated electrodes and adapted for movement therewith; circuit means coupled to the elongated electrodes and to a current-return point for energizing the elongated electrodes with a substantially constant potential relative to the current-return point; passive, low-impedance electrical circuit elements directly connected in series between the elongated and central electrodes for energizing the central electrode with approximately the same potential as is applied to the elongated electrodes, one of these circuit elements comprising means for developing a signal representative of the amount of current flowing from the central electrode into adjacent earth formations; feedback circuit means coupled to the elongated and central electrodes and responsive to any voltage difference therebetween for developing across another of the circuit elements an opposite-polarity voltage component for minimizing such voltage difference while maintaining the central electrode current flow; and means responsive to the current-representative signal for providing an indication of the central electrode current flow.

14. In apparatus for investigating earth formations traversed by a borehole, the combination comprising: a pair of electrically interconnected elongated electrodes adapted to be moved through the borehole; a central electrode positioned intermediate the elongated electrodes and adapted for movement therewith; circuit means coupled to the elongated electrodes and to a current-return point for energizing the elongated electrodes with a substantially constant potential relative to the current-return point; passive, low-impedance electrical circuit elements directly connected in series between the elongated and central electrodes for energizing the central electrode with approximately the same potential as is applied to the elongated electrodes, one of these circuit elements comprising means for developing a signal representative of the amount of current flowing from the central electrode into adjacent earth formations; first feedback circuit means responsive to the current-representative signal for developing across another of the circuit elements a voltage of polarity opposite to the voltage drop across the first-mentioned circuit element for minimizing the voltage difference between the elongated and central electrodes while maintaining the central electrode current flow; second feedback circuit means coupled to the elongated and central electrodes and responsive to any remaining voltage difference therebetween for developing across one of the circuit elements an opposite-polarity voltage component for further minimizing such voltage difference; and means responsive to the current-representative signal for providing an indication of the central electrode current flow.

References Cited in the file of this patent

UNITED STATES PATENTS

| | | |
|---|---|---|
| 2,712,627 | Doll | July 5, 1955 |
| 2,712,628 | Doll | July 5, 1955 |
| 2,729,784 | Fearon | Jan. 3, 1956 |
| 2,824,279 | Ferre | Feb. 18, 1958 |